US012795506B2

(12) United States Patent
Tiwari et al.

(10) Patent No.: US 12,795,506 B2
(45) **Date of Patent: *Nov. 10, 2026**

(54) METHOD AND SYSTEM FOR MANAGING CLOSED ACCESS GROUP FEATURE FOR USER EQUIPMENT AND NETWORK

(71) Applicant: Samsung Electronics Co., Ltd., Suwon-si (KR)

(72) Inventors: Kundan Tiwari, Bangalore (IN); Anikethan Ramakrishna Vijaya Kumar, Bangalore (IN); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

This patent is subject to a terminal disclaimer.

(21) Appl. No.: 18/393,333

(22) Filed: Dec. 21, 2023

(65) Prior Publication Data

US 2024/0172087 A1 May 23, 2024

Related U.S. Application Data

(63) Continuation of application No. 16/993,179, filed on Aug. 13, 2020, now Pat. No. 11,902,878.

(51) Int. Cl.
*H04W 48/02* (2009.01)
*H04W 8/08* (2009.01)
(Continued)

(52) U.S. Cl.
CPC ............ *H04W 48/02* (2013.01); *H04W 8/08* (2013.01); *H04W 8/24* (2013.01); *H04W 48/16* (2013.01);
(Continued)

(58) Field of Classification Search
CPC ......... H04W 48/02; H04W 8/08; H04W 8/24; H04W 48/16; H04W 48/20; H04W 60/00; H04W 76/18; H04W 84/042; H04W 8/06
See application file for complete search history.

(56) References Cited

U.S. PATENT DOCUMENTS

2010/0199326 A1 8/2010 Singh et al.
2011/0177814 A1 7/2011 Buchmayer et al.
(Continued)

FOREIGN PATENT DOCUMENTS

WO 2018203713 A1 11/2018

OTHER PUBLICATIONS

Nokia, 5GMM cause value for CAG, 3GPP TSG-CT WG1 Meeting #117, C1-193510, Reno (NV), USA, May 13-17, 2019). (Year: 2019).*

(Continued)

*Primary Examiner* — Said M Elnoubi

(57) ABSTRACT

A method for managing a Closed Access Group (CAG) feature using an Access and Mobility Management Function (AMF) server. The method includes receiving a registration request message from a User Equipment (UE) for registering for a CAG subscription. The method includes determining that the UE is subscribed to access the network through a CAG cell only. The method includes determining whether the registration request message includes a CAG support indicator. The method includes determining whether the UE supports the CAG feature based on the CAG support indicator. The method includes sending either a registration accept message including a CAG information list to the UE when the UE supports the CAG feature, or a registration reject message including a 5GMM cause value other than a 5GMM cause #76 to the UE when the UE does not support the CAG feature.

12 Claims, 7 Drawing Sheets

(51) Int. Cl.

| | |
|---|---|
| ***H04W 8/24*** | (2009.01) |
| ***H04W 48/16*** | (2009.01) |
| ***H04W 48/20*** | (2009.01) |
| ***H04W 60/00*** | (2009.01) |
| ***H04W 76/18*** | (2018.01) |
| *H04W 84/04* | (2009.01) |

(52) U.S. Cl.
CPC .......... *H04W 48/20* (2013.01); *H04W 60/00* (2013.01); *H04W 76/18* (2018.02); *H04W 84/042* (2013.01)

(56) References Cited

U.S. PATENT DOCUMENTS

| | | | | |
|---|---|---|---|---|
| 2015/0172926 | A1 | 6/2015 | Buchmayer et al. | |
| 2019/0110244 | A1 | 4/2019 | Shih et al. | |
| 2020/0351755 | A1* | 11/2020 | Huang-Fu ............. | H04W 8/186 |
| 2021/0120596 | A1 | 4/2021 | Youn et al. | |

OTHER PUBLICATIONS

"3rd Generation Partnership Project; Technical Specification Group Core Network and Terminals; Non-Access-Stratum (NAS) protocol for 5G System (5GS); Stage 3 (Release 16)", 3GPP TS 24.501 V16.1.0 (Jun. 2019), 541 pages.

Samsung, "Handling of Rel-15 UE with CAG Only subscription", Change Request, 3GPP TSG-CT WG1 Meeting #119, Aug. 26-30, 2019, C1-194544, 2 pages.

Samsung et al., "Transmission of the UE CAG capability to the network", Change Request, 3GPP TSG-CT WG1 Meeting #120, Nov. 11-15, 2019, C1-198349, 29 pages.

InterDigital, Inc., "CAG-only indication and empty Allowed CAG list", Change Request, 3GPP TSG-SA WG2 Meeting #134, Jun. 24-28, 2019, S2-1907416, 4 pages.

Supplementary European Search Report dated Aug. 5, 2022 in connection with European Patent Application No. 20 85 4729, 10 pages.

International Search Report and Written Opinion of the International Searching Authority in connection with International Application No. PCT/KR2020/010749 dated Nov. 11, 2020, 8 pages.

3GPP TS 23.122 V16.2.0 (Jun. 2019), Technical Specification, 3rd Generation Partnership Project; Technical Specification Group Core Network and Terminals; Non-Access-Stratum (NAS) functions related to Mobile Station (MS) in idle mode (Release 16), Jun. 2019, 72 pages.

Nokia, et al., "5GMM cause value for CAG," C1-193510, 3GPP TSG-CT WG1 Meeting #117, Reno, Nevada, USA, May 13-17, 2019, 24 pages.

3GPP TS 24.501 V16.1.0 (Jun. 2019), Technical Specification, 3rd Generation Partnership Project; Technical Specification Group Core Network and Terminals; Non-Access-Stratum (NAS) protocol for 5G System (5GS); Stage 3 (Release 15), Jun. 2019, 543 pages.

Office Action dated Nov. 30, 2023, in connection with Chinese Patent Application No. 202080057642.9, 18 pages.

Communication pursuant to Article 94(3) EPC dated Jan. 19, 2024, in connection with European Patent Application No. 20854729.9, 5 pages.

* cited by examiner

METHOD AND SYSTEM FOR MANAGING CLOSED ACCESS GROUP FEATURE FOR USER EQUIPMENT AND NETWORK

CROSS-REFERENCE TO RELATED APPLICATIONS

This application is a continuation of application Ser. No. 16/993,179 filed Aug. 13, 2020, which is based on and claims priority under 35 U.S.C. § 119 to Indian Provisional Patent Application No. 201941033184 filed on Aug. 16, 2019, and Indian Complete Patent Application No. 201941033184 filed on Jul. 21, 2020, the disclosures of which are herein incorporated by reference in their entirety.

BACKGROUND

1. Field

The present disclosure relates to electronic devices, and more specifically to a method and a system for managing a Closed Access Group (CAG) feature for a User Equipment (UE) and a network.

2. Description of Related Art

Two types of UEs that are defined as per Third Generation Partnership Project (3GPP) TS 23.501 are a UE which supports a CAG feature and a UE which does not support the CAG feature. Similarly, two types of networks that are defined as per the 3GPP TS 23.501 is a network supports CAG feature and a network does not support CAG feature. Conventional methods do not define a behavior of the network that supports the CAG feature to handle the UE that does not support the CAG feature. In addition, the conventional methods do not define the behavior of the network that does not support the CAG feature to handle the UE that supports the CAG feature.

FIG. 1 illustrates a sequential diagram of signaling between an Access and Mobility Management Function (AMF) and the UE for registering the CAG subscription of the UE at the network, according to the conventional methods. Consider, the AMF of the network supports the CAG feature and the UE does not support CAG feature. Consider, a Universal Integrated Circuit Card (UICC) is inserted for first time to the UE, where the UICC includes a Universal Subscriber Identity Module (USIM) application having CAG subscriptions. At step S101, the UE selects (S101) and camps on a non-CAG cell due to not supporting the CAG feature. At step S102, the UE initiates a registration procedure to the network by sending a registration request message to the AMF. The UE does not indicate to the AMF whether UE supports the CAG feature or not, while sending the registration request message. Therefore, the AMF does not know whether the UE supports CAG feature or not. At step S103, in response to receiving the registration request message, the AMF assumes that the UE supports the CAG feature based on the CAG subscription of the UICC.

At step S104, the AMF determines the UE accessed the non-CAG cell instead of the CAG cell for registering the CAG subscription. Further, the AMF configures a registration reject message with 5GMM cause #76, where the 5GMM cause #76 indicates that the UE is not authorized for the CAG call or authorized to access CAG cells only. At step S105, the AMF sends the registration reject message with 5GMM cause #76 to the UE. At step S106, the UE does not understand the 5GMM cause #76 and discard the registration reject message as the 5GMM cause #76 is related to a CAG. At step S107, the UE repeats the steps S102-S105 after an expiry of a timer T1. Further, the UE fails again to access the 5GS services. Repeating the steps S102-S105 after the expiry of the timer T1 and failing to access the 5GS services executes in a loop at the UE. Therefore, the UE stays at the same non-CAG cell, and does not register and attach to the network. Moreover, the UE never get the 5G services when the UE is at same location. Thus, it is desired to address the above-mentioned shortcomings or at least provide a useful alternative.

The principal object of the embodiments herein is to provide a method and a system for managing a CAG feature for a UE and a network.

Another object of the embodiments herein is to determine whether a registration request message from the UE includes a CAG support indicator, where the CAG support indicator indicates whether the UE supports or does not support the CAG feature.

Another object of the embodiments herein is to determine whether the UE supports the CAG feature based on the CAG support indicator.

Another object of the embodiments herein is to send a registration reject message includes a 5GMM cause value other than 5GMM cause #76 to the UE, in response to determining that the UE (100) does not support the CAG feature and the UE (100) is subscribed to access the network through a CAG cell only.

Another object of the embodiments herein is to send a registration reject message includes one of 5GMM cause #7, 5GMM cause #27, and 5GMM cause #11 to the UE, in response to determining that the UE (100) does not support the CAG feature and the UE (100) is subscribed to access the network through the CAG cell only.

SUMMARY

Accordingly, the embodiments herein provide a method for managing a CAG feature for a UE and a network. The method includes receiving, by an AMF server, a registration request message from the UE for registering for a CAG subscription. Further, the method includes determining, by the AMF, that the UE is subscribed to access the network through a CAG cell only. Further, the method includes determining, by the AMF, whether the registration request message includes a CAG support indicator, where the CAG support indicator indicates whether the UE supports or does not support the CAG feature. Further, the method includes determining, by the AMF, whether the UE supports the CAG feature based on the CAG support indicator. Further, the method includes performing, by the AMF, one of: sending a registration accept message includes a CAG information list to the UE, in response to determining that the UE supports the CAG feature, and sending a registration reject message to the UE, in response to determining that the UE does not support the CAG feature.

In an embodiment, the registration request message is one of an initial registration request and a mobility registration update request message.

In an embodiment, the CAG support indicator is a one-bit information provided in a 5GMM capability information element of the registration request message.

In an embodiment, the registration reject message includes a 5GMM cause value other than a 5GMM cause #76.

In an embodiment, the 5GMM cause value is one of: 5GMM cause #3 indicates an illegal UE, 5GMM cause #6 indicates an illegal ME, 5GMM cause #7 indicates that 5GS services not allowed, 5GMM cause #11 indicates that PLMN not allowed, 5GMM cause #12 indicates that a tracking area is not allowed, 5GMM cause #13 indicates that roaming is not allowed in the tracking area, 5GMM cause #15 indicates that no suitable cells are available in the tracking area, 5GMM cause #22 indicates a congestion, 5GMM cause #27 indicates that N1 mode not allowed, and 5GMM cause #31 indicates that a redirection to an EPC is required.

In an embodiment, the 5GMM cause #76 indicates that the UE is not authorized for a CAG cell or authorized for CAG cells only In an embodiment, the method includes determining, by the UE, whether the 5GMM cause value in the registration reject message is one of the 5GMM cause #7, the 5GMM cause #27, and the 5GMM cause #11, in response to receiving the registration reject message from the AMF. Further, the method includes performing, by the UE, one of: disabling the N1 mode and avoid resending the registration request message through a non-CAG cell, in response to determining that the 5GMM cause value received from the AMF is one of the 5GMM cause #7 and the 5GMM cause #27, and updating a Public Land Mobile Network (PLMN) corresponds to the non-CAG cell to a forbidden PLMN list, and selecting another PLMN to obtain a service from the network, in response to determining that the 5GMM cause value received from the AMF is the 5GMM cause #11.

Accordingly, the embodiments herein provide a method for managing the CAG feature for the UE and the network. The method includes sending, by the UE, the registration request message to the AMF of the network for registering for the CAG subscription, and indicating whether the UE supports or does not support the CAG feature. The method includes performing, by the UE, one of: receiving the registration accept message includes the CAG information list from the AMF, when the UE supports the CAG feature and the UE is subscribed to access the network through the CAG cell only, and receiving the registration reject message from the AMF, when the UE does not support the CAG feature and the UE is subscribed to access the network through the CAG cell only.

In an embodiment, the registration request message includes the CAG support indicator to indicate whether the UE supports or does not support the CAG feature.

Accordingly, the embodiments herein provide the AMF for managing the CAG feature. The AMF includes a CAG message controller, a memory, a processor, where the CAG message controller is coupled to the memory and the processor. The CAG message controller is configured to receive the registration request message from the UE for registering for the CAG subscription. The CAG message controller is configured to determine that the UE is subscribed to access the network through the CAG cell only. The CAG message controller is configured to determine whether the registration request message includes the CAG support indicator, where the CAG support indicator indicates whether the UE supports or does not support the CAG feature. The CAG message controller is configured to determine whether the UE supports the CAG feature based on the CAG support indicator. The CAG message controller is configured to perform one of: sending the registration accept message includes the CAG information list to the UE, in response to determining that the UE supports the CAG feature, and sending the registration reject message to the UE, in response to determining that the UE does not support the CAG feature.

Accordingly, the embodiments herein provide the UE for managing the CAG feature. The UE includes a CAG message controller, a memory, a processor, where the CAG message controller is coupled to the memory and the processor. The CAG message controller is configured to send the registration request message to the AMF of the network for registering for the CAG subscription, and indicate whether the UE supports or does not support the CAG feature. The CAG message controller is configured to perform one of: receiving the registration accept message includes the CAG information list from the AMF, when the UE supports the CAG feature and the UE is subscribed to access the network through the CAG cell only, and receiving the registration reject message from the AMF, when the UE does not support the CAG feature and the UE is subscribed to access the network through a CAG cell only.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
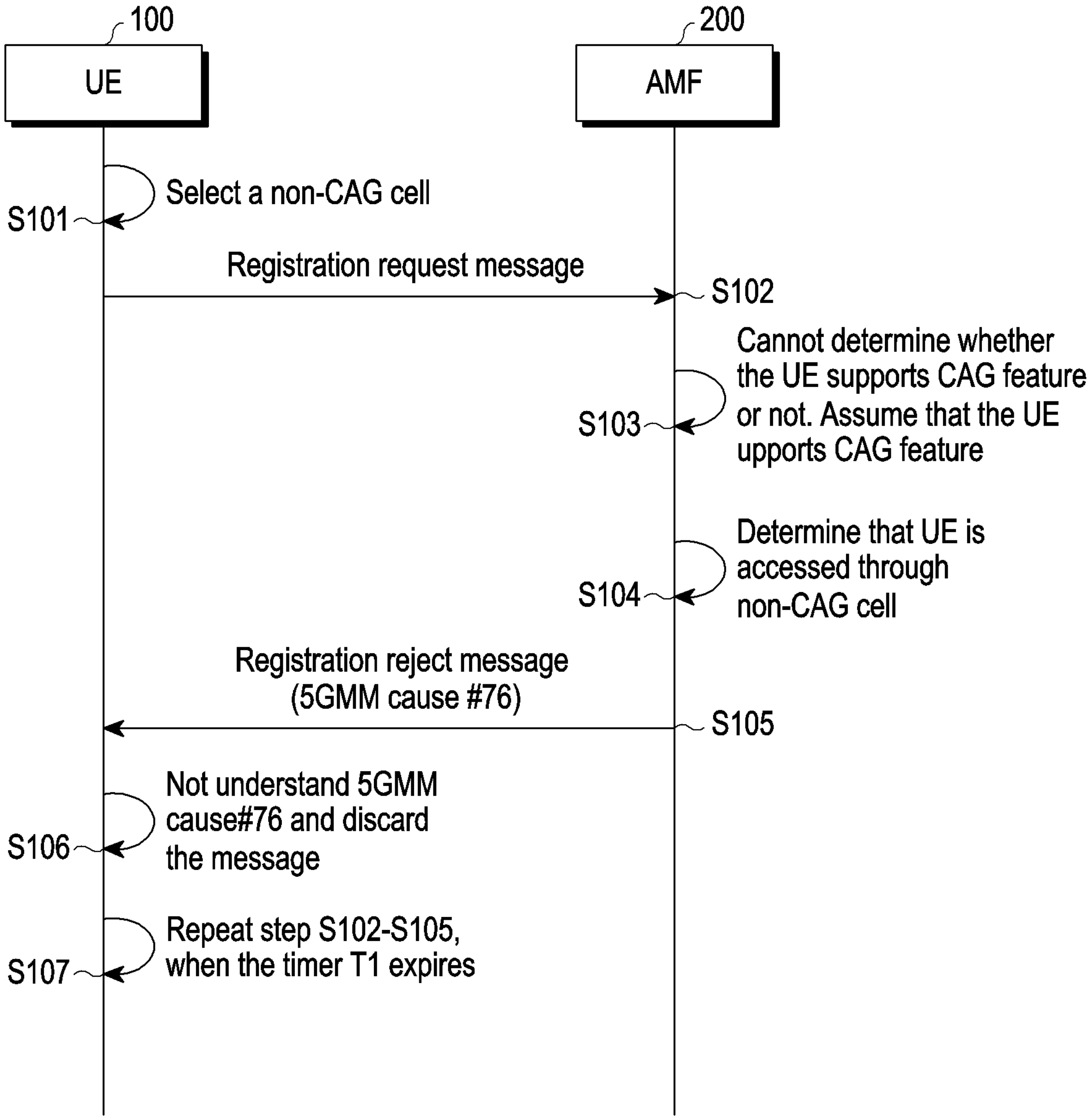
FIG. 1 illustrates a sequential diagram of signaling between an AMF and a UE for registering a CAG subscription of the UE at a network, according to a prior art.

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware and software. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

Accordingly, the embodiments herein provide a method for managing a Closed Access Group (CAG) feature for a User Equipment (UE) and a network. The method includes receiving, by an Access and Mobility Management Function (AMF) server, a registration request message from the UE for registering for a CAG subscription. Further, the method includes determining, by the AMF, that the UE is subscribed to access the network through a CAG cell only. Further, the method includes determining, by the AMF, whether the registration request message includes a CAG support indicator, where the CAG support indicator indicates whether the UE supports or does not support the CAG feature. Further, the method includes determining, by the AMF, whether the UE supports the CAG feature based on the CAG support indicator. Further, the method includes performing, by the AMF, one of: sending a registration accept message includes a CAG information list to the UE, in response to determining that the UE supports the CAG feature, and sending a registration reject message includes a Fifth Generation Mobility Management 5GMM cause value other than a 5GMM cause #76 to the UE, in response to determining that the UE does not support the CAG feature.

Unlike existing methods and systems, the AMF sends the registration reject message with a 5GMM cause #7 or a 5GMM cause #11 or 5GMM cause #27 to the UE, in response to determining that the UE does not support the CAG feature. The UE understands the 5GMM cause #7 or the 5GMM cause #11 or the 5GMM cause #27. The UE disables a N1 mode and will not retry a registration procedure on a cell which is used by the UE to send the registration request message, in response to detecting the 5GMM cause #7 or the 5GMM cause #27. Therefore, the UE can select another cell to obtain 5G system (5GS) services at the earliest without facing a significant delay. The UE put a Public Land Mobile Network (PLMN) which is used by the UE to send the registration request message into a forbidden PLMN list, in response to detecting the 5GMM cause #11. Therefore, the UE can select another PLMN to obtain 5GS services at the earliest without facing the significant delay.

Referring now to the drawings, and more particularly to FIGS. 2 through 7, there are shown preferred embodiments.

Figure 2:
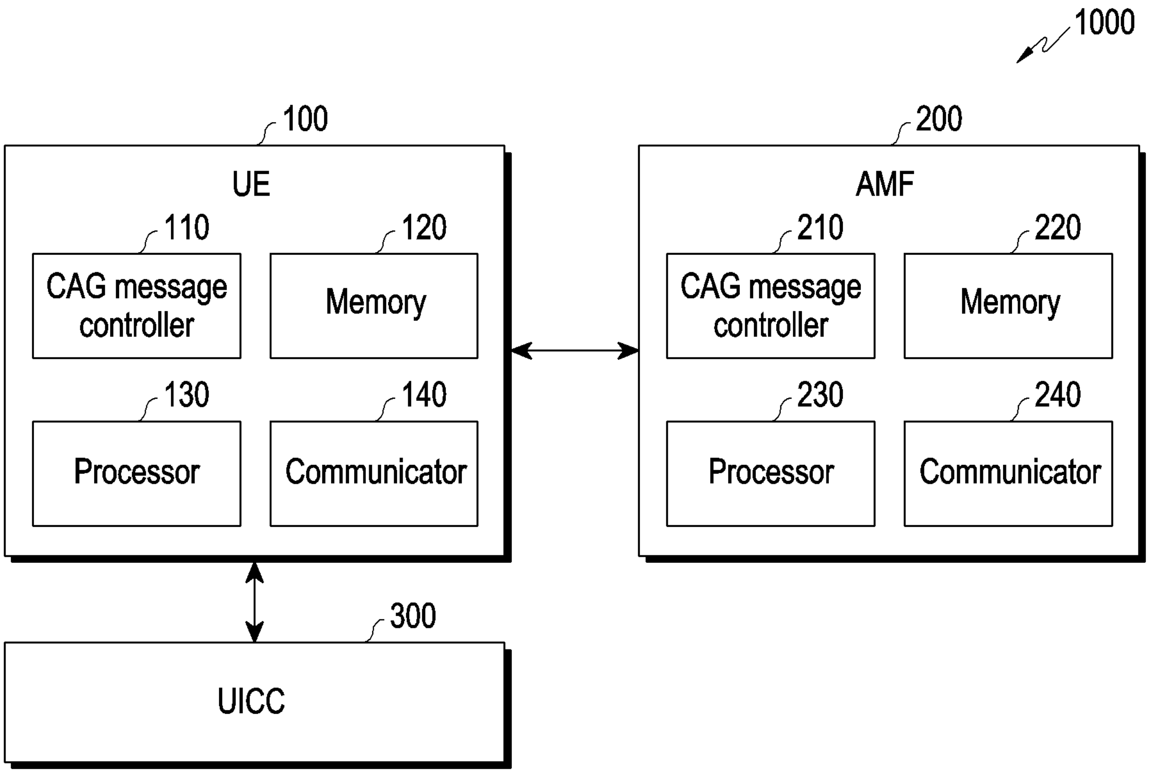
FIG. 2 illustrates a block diagram of a system for managing a CAG feature for the UE and the network, according to an embodiment as disclosed herein.

FIG. 2 illustrates a block diagram of a system (1000) for managing a CAG feature for the UE (100) and the network, according to an embodiment as disclosed herein. In an embodiment, the system (1000) includes the UE (100), an AMF (200), and a Universal Integrated Circuit Card (UICC) (300), where the UICC (300) is coupled to the UE (100). The UICC (300) includes a Universal Subscriber Identity Module (USIM) application having CAG subscriptions. The AMF (200) is a part of the network and the AMF (200) supports the CAG feature. Examples for the network are a 5G core network (5GC), a Next Generation-Radio Access Network (NG-RAN), and a 5GS. Examples for the UE (100) are, but not limited to a smart phone, a tablet computer, a personal digital assistance (PDA), an Internet of Things (IOT), and the like. In an embodiment, the UE (100) includes a CAG message controller (110), a memory (120), a processor (130), and a communicator (140). In an embodiment, the AMF (200) includes a CAG message controller (210), a memory (220), a processor (230), and a communicator (240).

The CAG message controller (110) is configured to select a cell of a PLMN to camp in response receiving a signal from a base station corresponds to the cell, where the base station is connected to the AMF (200). In an embodiment, the UE (100) operates in an automatic network selection mode or a manual network selection mode. In an embodiment the cell is a CAG cell or a non-CAG cell. In an embodiment the PLMN is a Home PLMN (HPLMN) or a Visiting PLMN (VPLMN) Further, the CAG message controller (110) is configured to initiate a Non-Access Stratum (NAS) procedure (e.g. Registration procedure) by sending a registration request message to the AMF (200) through the cell for registering a CAG subscription to the network. In an embodiment, the registration request message is an initial registration request or a mobility registration update request message. In an embodiment, the registration request message is a NAS message.

The CAG message controller (110) is configured to indicate to the AMF (200) whether the UE (100) supports or does not support the CAG feature while sending the registration request message. In an embodiment, the registration request message contains a CAG support indicator when the UE (100) supports the CAG feature. In an embodiment, the CAG support indicator is a one-bit information provided in a 5GMM capability Information Element (IE) of the registration request message. Further, the registration request message does not contain the CAG support indicator when the UE (100) does not support the CAG feature. In another embodiment, the registration request message includes the CAG support indicator to indicate whether the UE (100) supports or does not support the CAG feature. In an embodiment, the CAG message controller (110) is configured to set a value of the CAG support indicator in the registration request message to TRUE, when the UE (100) supports the CAG feature.

The CAG message controller (110) is configured to set the value of the CAG support indicator in the registration request message to FALSE, when the UE (100) does not support the CAG feature. In another embodiment, the CAG message controller (110) is configured to set a CAG bit in the 5GMM capability IE of the registration request message to “CAG supported”, when the UE (100) supports the CAG feature. The CAG message controller (110) is configured to set the CAG bit in the 5GMM capability IE of the registration request message to “CAG not supported”, when the UE (100) does not support the CAG feature. Contents in the 5GMM capability information element is given in a table 1.

TABLE 1

| 5GMM capability information element | | | | | | | | |
|---|---|---|---|---|---|---|---|---|
| bit 8 | bit 7 | bit 6 | bit 5 | bit 4 | bit 3 | bit 2 | bit 1 | |
| 5GMM capability IEI | | | | | | | | octet 1 |
| Length of 5GMM capability contents | | | | | | | | octet 2 |
| SGC | 5G-HC-CP CIoT | N3 data | 5G-CP CIoT | RestrictEC | LPP | HO attach | S1 mode | octet 3 |
| RACS | NSSAA | 5G-LCS | V2X CNP C5 | V2X CEP C5 | V2X | 5G-UP CIoT | 5GSR VCC | octet 4* |
| 0 | 0 | 0 | 0 | 0 | 0 | 0 | CAG | Octet 5* |
| 0 | 0 | 0 | 0 | 0 | 0 | 0 | 0 | octet 6*-15* |
| Spare | | | | | | | | |

An entry in the 5GMM capability information element in octet 5*row and bit 1 column in the table, i.e. CAG is set to 0 when the UE (100) does not support the CAG feature. Further, the entry CAG is set to 0 when the UE (100) does not support the CAG feature.

The CAG message controller (210) is configured to determine that the UE (100) is subscribed to access the network through a CAG cell only based on the CAG subscription of the UICC (300), in response to receiving the registration request message from the UE (100).

Further, the CAG message controller (210) is configured to determine whether the registration request message includes the CAG support indicator. Further, the CAG message controller (210) is configured to determine whether the UE (100) supports the CAG feature based on the CAG support indicator. In an embodiment, the CAG message controller (210) is configured to determine that the UE (100) supports the CAG feature, in response detecting the CAG support indicator in the registration request message. The CAG message controller (210) is configured to determine that the UE (100) does not support the CAG feature, in response not detecting the CAG support indicator in the registration request message. In another embodiment, the CAG message controller (210) is configured to determine that the UE (100) supports the CAG feature, in response to detecting the set value TRUE from the CAG support indicator in the registration request message. The CAG message controller (210) is configured to determine that the UE (100) does not support the CAG feature, in response to not detecting the set value FALSE from the CAG support indicator in the registration request message.

The CAG message controller (210) is configured to send a registration accept message includes a CAG information list to the UE (100) for updating the CAG information list stored at the UE (100), in response to determining that the UE (100) supports the CAG feature. In an embodiment, the CAG message controller (210) is configured to send the registration accept message includes the CAG information list to the UE (100), in response to determining that the UE (100) supports the CAG feature and the cell through which the UE (100) sends the registration request message is the CAG cell. In an embodiment, the registration accept message is a NAS message. In an embodiment, the CAG information list includes a list of CAG IDs corresponds to CAG cells allowed to the UE (100) to access. Further, the CAG message controller (110) is configured to camp on the CAG cell corresponds to a CAG ID in the list for accessing 5GS services, in response to receiving the registration accept message.

The CAG message controller (210) is configured to send a registration reject message includes a 5GMM cause value (i.e. NAS cause value) other than 5GMM cause #76 to the UE (100), in response to determining that the UE (100) does not support the CAG feature and the UE (100) is allowed to access the 5GS via the CAG cell. In an embodiment, the CAG message controller (210) is configured to send the registration reject message includes the 5GMM cause value other than 5GMM cause #76 to the UE (100), in response to determining that the UE (100) does not support the CAG feature and the cell through which the UE (100) sends the registration request message is the non-CAG cell and the UE (100) is allowed to access the 5GS via the CAG cell. In an embodiment, the registration reject message is a NAS message. In an embodiment, the 5GMM cause #76 indicates that the UE (100) is not authorized for the CAG cell or authorized for CAG cells only. In an embodiment, the 5GMM cause value is one of a 5GMM cause #3 indicates an illegal UE, 5GMM cause #6, 5GMM cause #7, 5GMM cause #11, 5GMM cause #12, 5GMM cause #13, 5GMM cause #15, 5GMM cause #22, 5GMM cause #27, and 5GMM cause #31.

The 5GMM cause #3 indicates that the UE (100) is an illegal UE. The 5GMM cause #6 indicates that the UE (100) is an illegal Mobile Equipment (ME). The 5GMM cause #7 indicates that the 5GS services are not allowed for the UE (100). The 5GMM cause #11 indicates that PLMN not allowed for the UE (100). The 5GMM cause #12 indicates that a tracking area is not allowed for the UE (100). The 5GMM cause #13 indicates that roaming is not allowed in the tracking area for the UE (100). The 5GMM cause #15 indicates that no suitable cells are available in the tracking area for the UE (100). The 5GMM cause #22 indicates a congestion to the UE (100). The 5GMM cause #27 indicates that N1 mode is not allowed to the UE (100). The 5GMM cause #31 indicates that a redirection to an EPC is required.

In an embodiment, the CAG message controller (210) is configured to receive the registration request message from the UE (100) through the cell of the HPLMN. Further, the CAG message controller (210) is configured to determine that the UE (100) does not support the CAG feature, the UE (100) has the CAG subscription and the UE (100) is in the HPLMN. Further, the CAG message controller (210) is configured to send the registration reject message including the 5GMM cause #7 or the 5GMM cause #27 to the UE (100).

In another embodiment, the CAG message controller (210) is configured to receive the registration request message from the UE (100) through the cell of the VPLMN. Further, the CAG message controller (210) is configured to determine that the UE (100) does not support the CAG feature, the UE (100) has the CAG subscription and the UE (100) is in the VPLMN. Further, the CAG message controller (210) is configured to send the registration reject message including the 5GMM cause #11 or the 5GMM cause #27 to the UE (100).

In another embodiment, the CAG message controller (110) is configured to determine whether the 5GMM cause value in the registration reject message is one of 5GMM cause #7, 5GMM cause #27, and 5GMM cause #11, in response to receiving the registration reject message from the AMF (200). In an embodiment, the CAG message controller (110) is configured to disable a N1 mode and avoid resending the registration request message through the non-CAG cell, in response to determining that the 5GMM cause value received from the AMF (200) is one of the 5GMM cause #7 and the 5GMM cause #27. In an embodiment, the CAG message controller (110) is configured to update the PLMN corresponds to the non-CAG cell to the forbidden PLMN list, and select another PLMN to obtain the service from the network, in response to determining that the 5GMM cause value received from the AMF (200) is the 5GMM cause #11.

In response to receiving the 5GMM cause #3 or the 5GMM cause #6, the UE (100) sets a 5GS update status to 5U3 ROAMING NOT ALLOWED, store the 5G update status. Further, the UE (100) deletes a 5G Globally Unique Temporary Identifier (5G-GUTI), a last visited registered Tracking Area Identifier (TAI), a TAI list and a 5G Key Set Identifier (ngKSI). The UE (100) considers the USIM as invalid for the 5GS services until switching off the UE (100) or the UICC (300) containing the USIM is removed from the UE (100). The UE (100) deletes a list of equivalent PLMNs and enter a state 5GMM-DEREGISTERED. When the registration reject message has been successfully integrity checked by a NAS, then the UE (100) sets the counter for "SIM/USIM considered invalid for General Packet Radio Services (GPRS) services" and the counter for "SIM/USIM considered invalid for 5GS services over non-3GPP access" to a UE implementation-specific maximum value (e.g. 5).

In an embodiment, when the UE (100) receives the registration reject message via a 3GPP access and the UE (100) is operating in single-registration mode, the UE (100) handles a Evolved packet system Mobility Management (EMM) parameters EMM state, a Evolved Packet System (EPS) update status, a 4G Globally Unique Temporary Identifier (4G-GUTI), a TAI list and EPS Key Set Identifier (eKSI) as specified in 3GPP TS 24.301 for the case when an EPS attach request procedure is rejected with a EMM cause with the 5GMM cause #3 or the 5GMM cause #6. The UE (100) considers the USIM as invalid also for non-EPS services until switching off the UE (100) or the UICC (300) containing the USIM is removed from the UE (100). In an embodiment, when the registration reject message has been successfully integrity checked by the NAS and the UE (100) maintains the counter for "SIM/USIM considered invalid for non-GPRS services", then the UE (100) sets the counter to the UE implementation-specific maximum value.

In an embodiment, when the registration reject message has been successfully integrity checked by the NAS and the UE (100) also supports the registration procedure over another access, then the UE (100) handles 5GMM parameters and a 5GMM state for this access, as described for the 5GMM cause value.

In response to receiving the 5GMM cause #7, the UE (100) sets the 5GS update status to the 5U3 ROAMING NOT ALLOWED and stores the 5GS update status according to subclause 5.1.3.2.2. Further, the UE (100) deletes the 5G-GUTI, the last visited registered TAI, the TAI list and the ngKSI.

In case of the PLMN, the UE (100) considers the USIM as invalid for the 5GS services until switching off the UE (100) or the UICC (300) containing the USIM is removed from the UE (100).

In case of the SNPN, the UE (100) considers an entry of "a list of subscriber data" with a Stand-alone Non-Public Network (SNPN) identity of a current SNPN as invalid for the 5GS services until the UE (100) is switched off or the entry is updated. Additionally, when an Extensible Authentication Protocol (EAP) based primary authentication and key agreement procedure using an EAP-Authentication and Key Agreement (AKA) or a 5G AKA based primary authentication and key agreement procedure was performed in the current SNPN, the UE (100) considers the USIM as invalid for the current SNPN until switching off the UE (100) or the UICC (300) containing the USIM is removed from the UE (100).

Further, the UE (100) enters the state 5GMM-DEREGISTERED. In case of the PLMN, when the registration reject message has been successfully integrity checked by the NAS, then the UE (100) sets the counter for "SIM/USIM considered invalid for GPRS services" events and the counter for "SIM/USIM considered invalid for 5GS services over non-3GPP access" events to the UE implementation-specific maximum value. In another embodiment, when the registration reject message has been successfully integrity checked by the NAS, then the UE (100) sets the counter for "the entry for the current SNPN considered invalid for 3GPP access" events to the UE implementation-specific maximum value in case of the PLMN. In another embodiment, when the registration reject message has been successfully integrity checked by the NAS, then the UE (100) deletes 5GMM parameters stored in the non-volatile memory (120) as specified in 3GPP TS 24.501.

In an embodiment, when the UE (100) receives the registration reject message via the 3GPP access and the UE (100) is operating in single-registration mode, the UE (100) handles the EMM parameters EMM state, the EPS update status, the 4G-GUTI, the TAI list and the eKSI as specified in 3GPP TS 24.301 for the case when the EPS attach request procedure is rejected with the EMM cause with the 5GMM cause #7. When the registration reject message has been successfully integrity checked by the NAS and the UE (100) also supports the registration procedure over another access, then the UE (100) handles the 5GMM parameters and the 5GMM state for another access, as described for this 5GMM cause value.

In response to receiving the 5GMM cause #11 through a cell belonging to the SNPN, the UE (100) considers as an abnormal case and a behavior of the UE (100) as specified in 3GPP TS 24.501. Further, the UE (100) sets the 5GS update status to 5U3 ROAMING NOT ALLOWED and stores the 5GS update status according to subclause 5.1.3.2.2. Further, the UE (100) deletes the 5G-GUTI, the last visited registered TAI, the TAI list and the ngKSI. Further, the UE (100) deletes a list of equivalent PLMNs, resets a registration attempt counter and stores a PLMN identity in to a "forbidden PLMN list". Further, the UE (100) enters to a state 5GMM-DEREGISTERED.PLMN-SEARCH and performs a PLMN selection according to 3GPP TS 23.122. When the registration reject message has been successfully integrity checked by the NAS, then the UE (100) sets a PLMN-specific attempt counter and a PLMN-specific attempt counter for non-3GPP access for that the PLMN to the UE implementation-specific maximum value.

In an embodiment, when the UE (100) receives the registration reject message via the 3GPP access and the UE (100) is operating in a single-registration mode, the UE (100) handles the EMM parameters EMM state, the EPS update status, the 4G-GUTI, the TAI list, the KSI and the attach attempt counter as specified in 3GPP TS 24.301 for the case when the EPS attach request procedure is rejected with the EMM cause with the 5GMM cause #11.

In an embodiment, when the registration reject message has been successfully integrity checked by the NAS and the UE (100) also supports the registration procedure over another access to the same PLMN, then the UE (100) handles the 5GMM parameters and the 5GMM state for this access, as described for the 5GMM cause #11.

In response to receiving the 5GMM cause #12, the UE (100) sets the 5GS update status to the 5U3 ROAMING NOT ALLOWED and stores the 5GS update status according to subclause 5.1.3.2.2. Further, the UE (100) deletes the 5G-GUTI, the last visited registered TAI, the TAI list and the ngKSI. Further, the UE (100) resets the registration attempt counter. Further, the UE (100) stores the current TAI in the list of "5GS forbidden tracking areas for regional provision of service" and enter the state 5GMM-DEREGISTERED.LIMITED-SERVICE.

In an embodiment, when the UE (100) receives the registration reject message via the 3GPP access and the UE (100) is operating in the single-registration mode, the UE (100) handles the EMM parameters EMM state, the EPS update status, the 4G-GUTI, the TAI list, the eKSI and the attach attempt counter as specified in 3GPP TS 24.301 for the case when the EPS attach request procedure is rejected with the EMM cause with the 5GMM cause #12.

In response to receiving the 5GMM cause #13, the UE (100) sets the 5GS update status to the 5U3 ROAMING NOT ALLOWED and stores the 5GS update status according to subclause 5.1.3.2.2. Further, the UE (100) deletes the 5G-GUTI, the last visited registered TAI, the TAI list and the ngKSI. Further, the UE (100) deletes the list of equivalent PLMNs and resets the registration attempt counter. Further, the UE (100) stores the current TAI in the list of "5GS forbidden tracking areas for roaming" and enters the state 5GMM-DEREGISTERED.LIMITED-SERVICE or optionally 5GMM-DEREGISTERED.PLMN-SEARCH.

In an embodiment, when the UE (100) is registered in a SI mode and operating in a dual-registration mode, the PLMN that the UE (100) chooses to register in is specified in subclause 4.8.3. In another embodiment, the UE (100) performs a PLMN selection according to 3GPP TS 23.122.

In an embodiment, when the UE (100) receives the registration reject message via the 3GPP access and the UE (100) is operating in the single-registration mode, the UE (100) handles the EMM parameters EMM state, the EPS update status, the 4G-GUTI, the TAI list, the eKSI and the attach attempt counter as specified in 3GPP TS 24.301 for the case when the EPS attach request procedure is rejected with the EMM cause with the 5GMM cause #13.

In response to receiving the 5GMM cause #15, the UE (100) sets the 5GS update status to the 5U3 ROAMING NOT ALLOWED and stores the 5GS update status according to subclause and the ngKSI. Further, the UE (100) resets the registration attempt counter. Further, the UE (100) stores the current TAI in the list of "5GS forbidden tracking areas for roaming" and enters to the state 5GMM-DEREGISTERED.LIMITED-SERVICE. Further, the UE (100) searches for a suitable cell in another tracking area according to 3GPP TS 38.304.

In an embodiment, when the UE (100) receives the registration reject message via the 3GPP access and the UE (100) is operating in the single-registration mode, the UE handles the EMM parameters EMM state, the EPS update status, the 4G-GUTI, the TAI list, the eKSI and the attach attempt counter as specified in 3GPP TS 24.301 for the case when the EPS attach request procedure is rejected with the EMM cause with the 5GMM cause #15.

In response to receiving the 5GMM cause #22 and when a T3346 value IE is present in the registration reject message and a value in the T3346 value IE indicates that a timer T3346 is neither zero nor deactivated, the UE (100) proceeds as described in method-1, otherwise the UE (100) considers as the abnormal case and the behavior of the UE (100) for this case is specified in subclause 5.5.1.2.7.

Method-1: The UE (100) aborts the initial registration procedure, sets the 5GS update status to 5U2 NOT UPDATED and enters state 5GMM-DEREGISTERED.ATTEMPTING-REGISTRATION. Further, the UE (100) stops the timer T3346 if the timer T3346 is running. When the registration reject message is integrity protected, then the UE (100) starts the timer T3346 with the value provided in the T3346 value IE. When the registration reject message is not integrity protected, then the UE (100) starts the timer T3346 with a random value from a default range specified in 3GPP TS 24.008. Further, the UE (100) stays in the current serving cell and applies a normal cell reselection process. In an embodiment, the UE (100) starts the initial registration procedure if still needed when the timer T3346 expires or is stopped.

In an embodiment, when the UE (100) receives the registration reject message via the 3GPP access and the UE (100) is operating in the single-registration mode, the UE handles the EMM parameters EMM state, the EPS update status, the 4G-GUTI, the TAI list, the eKSI and the attach attempt counter as specified in 3GPP TS 24.301 for the case when the EPS attach request procedure is rejected with the EMM cause with the 5GMM cause #22.

In response to receiving the 5GMM cause #27, the UE (100) sets the 5GS update status to the 5U3 ROAMING NOT ALLOWED and stores the 5GS update status according to subclause and the ngKSI. Further, the UE (100) resets the registration attempt counter and enters the state 5GMM-NULL or the state 5GMM-DEREGISTERED.LIMITED-SERVICE.

In an embodiment, in case of PLMN, when the registration reject message has been successfully integrity checked by the NAS, then the UE (100) sets the PLMN-specific N1 mode attempt counter for the 3GPP access and the PLMN-specific N1 mode attempt counter for the non-3GPP access for that PLMN to the UE implementation-specific maximum value. In case of SNPN, when the registration reject message has been successfully integrity checked by the NAS, then the UE (100) sets the SNPN-specific attempt counter for the 3GPP access for the current SNPN to the UE implementation-specific maximum value.

In another embodiment, when the registration reject message has been successfully integrity checked by the NAS, then the UE (100) disables a N1 mode capability for both 3GPP access and non-3GPP access (see subclause 4.9). In an embodiment, when the UE (100) receives the registration reject message via the 3GPP access and the UE (100) is operating in the single-registration mode, the UE sets the EPS update status to EU3 ROAMING NOT ALLOWED and deletes the 4G-GUTI, the last visited registered TAI, the TAI list and the eKSI. Additionally, the UE (100) resets the attach attempt counter and enters the state EMM-DEREGISTERED.

In response to receiving the 5GMM cause #31, the UE (100) sets the 5GS update status to the 5U3 ROAMING NOT ALLOWED and stores the 5GS update status according to subclause 5.1.3.2.2. Further, the UE (100) deletes the 5G-GUTI, the last visited registered TAI, the TAI list and the ngKSI. Further, the UE (100) resets the registration attempt counter and enters the state 5GMM-DEREGISTERED. Further, the UE (100) enables an E-UTRA capability if the E-UTRA capability was disabled, and disables the N1 mode capability for the 3GPP access (see subclause 4.9.2). When the UE (100) operates in the single-registration mode, the UE (100) handles the EMM parameters EMM state, the EPS update status, the 4G-GUTI, the TAI list, the eKSI and the attach attempt counter as specified in 3GPP TS 24.301 for the case when the EPS attach procedure is rejected with the EMM cause with the 5GMM cause #27.

In an embodiment, the UE (100) is allowed to access the 5GS via the CAG cell or the non-CAG cell for a VPLMN 1, and the UE (100) is allowed to access the 5GS via the CAG cell only for a VPLMN 2. In response to registering to the VPLMN 2 by the UE (100), the network sends the 5GMM cause #11 to the UE (100). In response to receiving the 5GMM cause #11, the UE (100) puts the VPLMN 2 in to the forbidden PLMN list. Further, the UE (100) never selects the VPLMN 2. Further, the UE (100) selects the non-CAG cell of VPLMN 1 and initiates the registration procedure on the non-CAG cell as the UE (100) is allowed to access the 5GS service on non-CAG cell. Further, the UE (100) obtains the 5GS service in VPLMN 1.

The memory (120) and the memory (220) may include non-volatile storage elements. Examples of such non-volatile storage elements may include magnetic hard discs, optical discs, floppy discs, flash memories, or forms of an Electrically Programmable Memory (EPROM) or an Electrically Erasable and Programmable Memory (EEPROM).

In addition, the memory (120) and the memory (220) may, in some examples, be considered a non-transitory storage medium. The term "non-transitory" may indicate that the storage medium is not embodied in a carrier wave or a propagated signal. However, the term "non-transitory" should not be interpreted that the memory (120) and the memory (220) are non-movable. In some examples, the memory (120) and the memory (220) can be configured to store larger amounts of information than the memory (120) and the memory (220) respectively. In certain examples, a non-transitory storage medium may store data that can, over time, change (e.g., in Random Access Memory (RAM) or cache).

The processor (130) is configured to execute instructions stored in the memory (120). The communicator (140) is configured to communicate internally between hardware components in the UE (100). Further, the communicator (140) is configured to facilitate the communication between the UE (100) and other devices (e.g. base station, UICC (300), etc.)

The processor (230) is configured to execute instructions stored in the memory (220). The communicator (240) is configured to communicate internally between hardware components in the AMF (200). Further, the communicator (240) is configured to facilitate the communication between the AMF (200) and other devices (e.g. the base station, etc.).

Although the FIG. 1 shows the hardware components of the system (1000) but it is to be understood that other embodiments are not limited thereon. In other embodiments, the system (1000) may include less or more number of components. Further, the labels or names of the components are used only for illustrative purpose and does not limit the scope of the invention. One or more components can be combined together to perform same or substantially similar function for managing the CAG feature.

Figure 3:
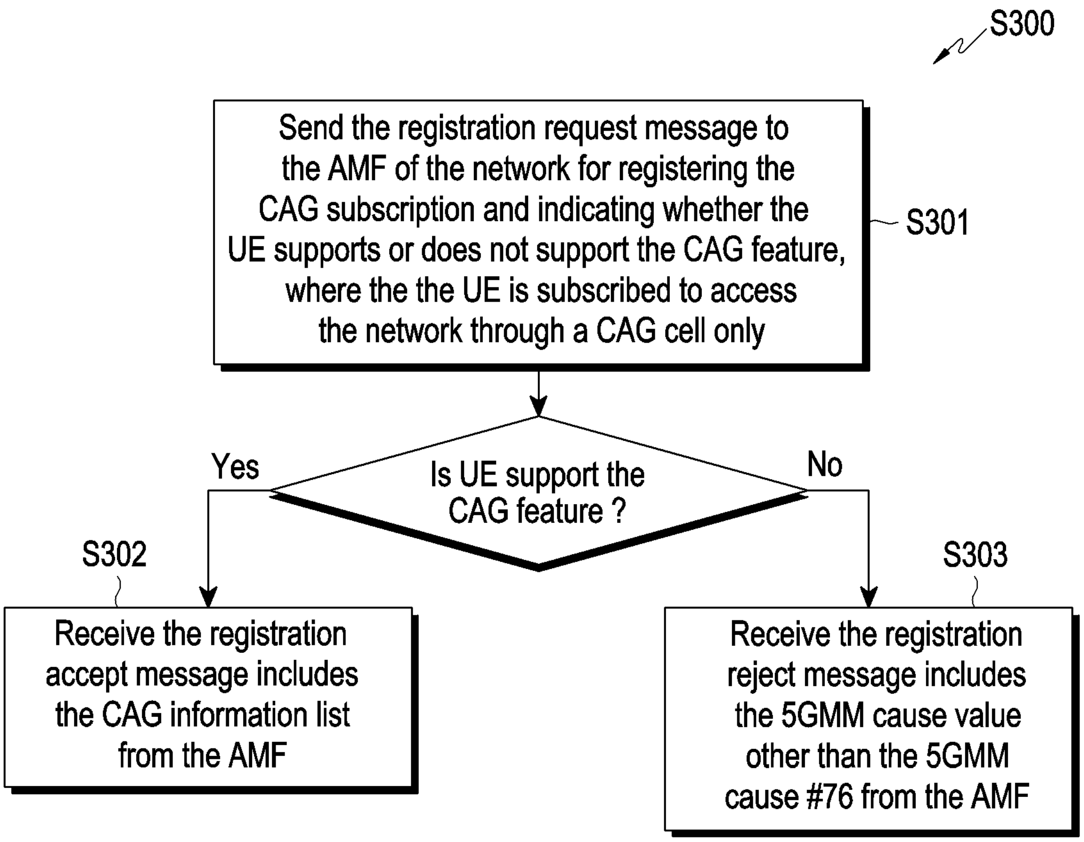
FIG. 3 illustrates a flow diagram of a method of managing the CAG feature at the UE, according to an embodiment as disclosed herein.

FIG. 3 illustrates a flow diagram S300 of a method of managing the CAG feature at the UE (100), according to an embodiment as disclosed herein. At step S301, the method includes sending the registration request message to the AMF (200) of the network for registering the CAG subscription and indicating whether the UE (100) supports or does not support the CAG feature, where the UE (100) is subscribed to access the network through the CAG cell only. In an embodiment, the method allows the CAG message controller (110) to send the registration request message to the AMF (200) of the network for registering the CAG subscription and indicate whether the UE (100) supports or does not support the CAG feature, where the UE (100) is subscribed to access the network through the CAG cell only. At step S302, the method includes receiving the registration accept message includes the CAG information list from the AMF (200), when the UE (100) supports the CAG feature. In an embodiment, the method allows the CAG message controller (110) to receive the registration accept message includes the CAG information list from the AMF (200), when the UE (100) supports the CAG feature. At step S303, the method includes receiving the registration reject message includes the 5GMM cause value other than the 5GMM cause #76 from the AMF (200), when the UE (100) does not support the CAG feature and the UE (100) is allowed to access the 5GS via the CAG cell only. In an embodiment, the method allows the CAG message controller (110) to receive the registration reject message includes the 5GMM cause value other than the 5GMM cause #76 from the AMF (200), when the UE (100) does not support the CAG feature.

The various actions, acts, blocks, steps, or the like in the flow diagram S300 may be performed in the order presented, in a different order or simultaneously. Further, in some embodiments, some of the actions, acts, blocks, steps, or the like may be omitted, added, modified, skipped, or the like without departing from the scope of the invention.

Figure 4:
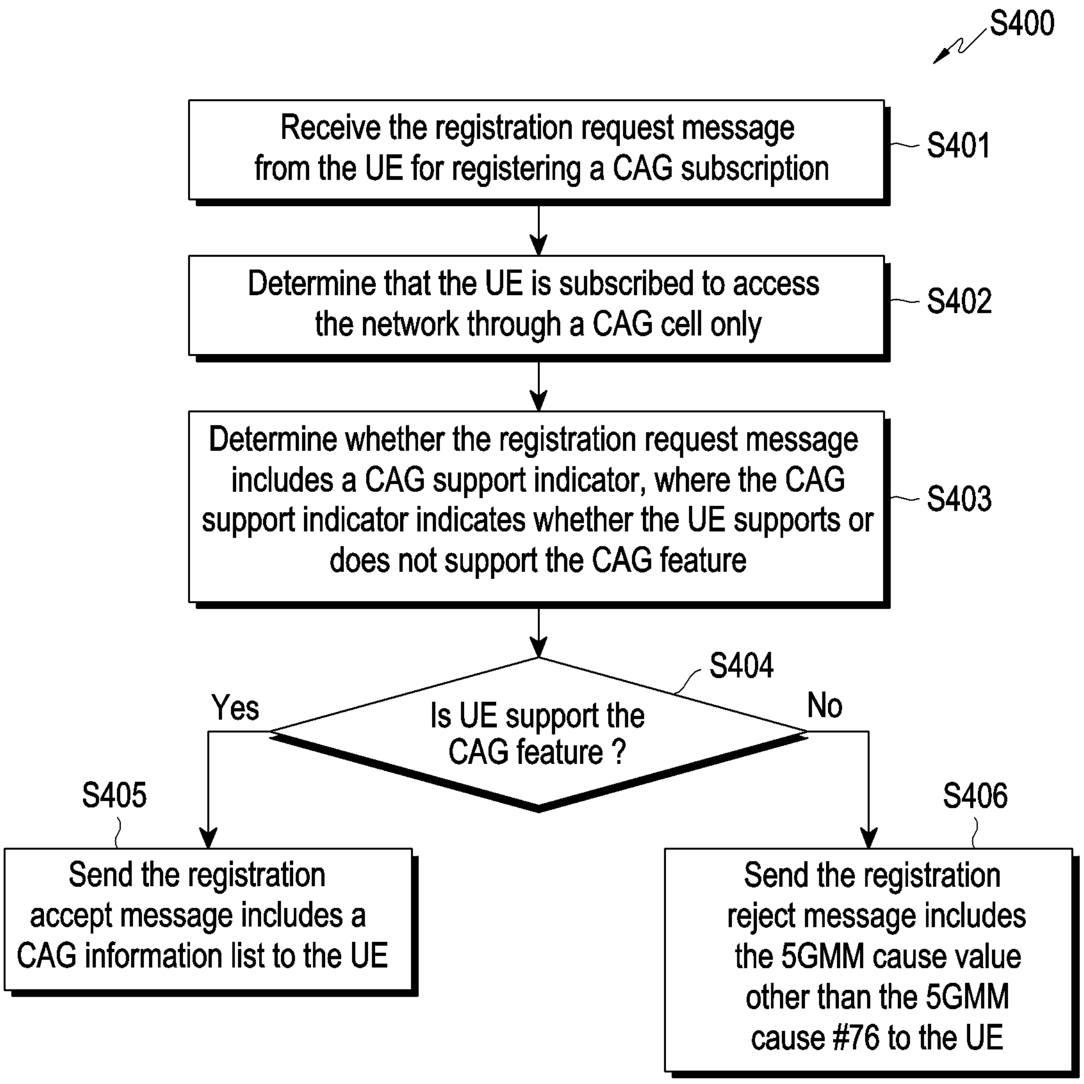
FIG. 4 illustrates a flow diagram of a method of managing the CAG feature at an AMF, according to an embodiment as disclosed herein.

FIG. 4 illustrates a flow diagram S400 of a method of managing the CAG feature at the AMF (200), according to an embodiment as disclosed herein. At step S401, the method includes receiving the registration request message from the UE (100) for registering the CAG subscription. In an embodiment, the method allows the CAG message controller (210) to receive the registration request message from the UE (100) for registering the CAG subscription. At step S402, the method includes determining that the UE (100) is subscribed to access the network through the CAG cell only. In an embodiment, the method allows the CAG message controller (210) to determine that the UE (100) is subscribed to access the network through the CAG cell only. At step S403, the method includes determining whether the registration request message includes the CAG support indicator, where the CAG support indicator indicates whether the UE (100) supports or does not support the CAG feature. In an embodiment, the method allows the CAG message controller (210) to determine whether the registration request message includes the CAG support indicator, where the CAG support indicator indicates whether the UE (100) supports or does not support the CAG feature.

At step S404, the method includes determining whether the UE (100) supports the CAG feature based on the CAG support indicator. In an embodiment, the method allows the CAG message controller (210) to determine whether the UE (100) supports the CAG feature based on the CAG support indicator. If the CAG support indicator is not included then the CAG message controller (210) determines that the UE (100) does not support the CAG feature. At step S405, the method includes sending the registration accept message includes the CAG information list to the UE (100), in response to determining that the UE (100) supports the CAG feature. In an embodiment, the method allows the CAG message controller (210) to send the registration accept message includes the CAG information list to the UE (100), in response to determining that the UE (100) supports the CAG feature. At step S406, the method includes sending the registration reject message includes the 5GMM cause value other than the 5GMM cause #76 to the UE (100), in response to determining that the UE (100) does not support the CAG feature. In an embodiment, the method allows the CAG message controller (210) to send the registration reject message includes the 5GMM cause value other than the 5GMM cause #76 to the UE (100), in response to determining that the UE (100) does not support the CAG feature.

The various actions, acts, blocks, steps, or the like in the flow diagram S400 may be performed in the order presented, in a different order or simultaneously. Further, in some embodiments, some of the actions, acts, blocks, steps, or the like may be omitted, added, modified, skipped, or the like without departing from the scope of the invention.

Figure 5:
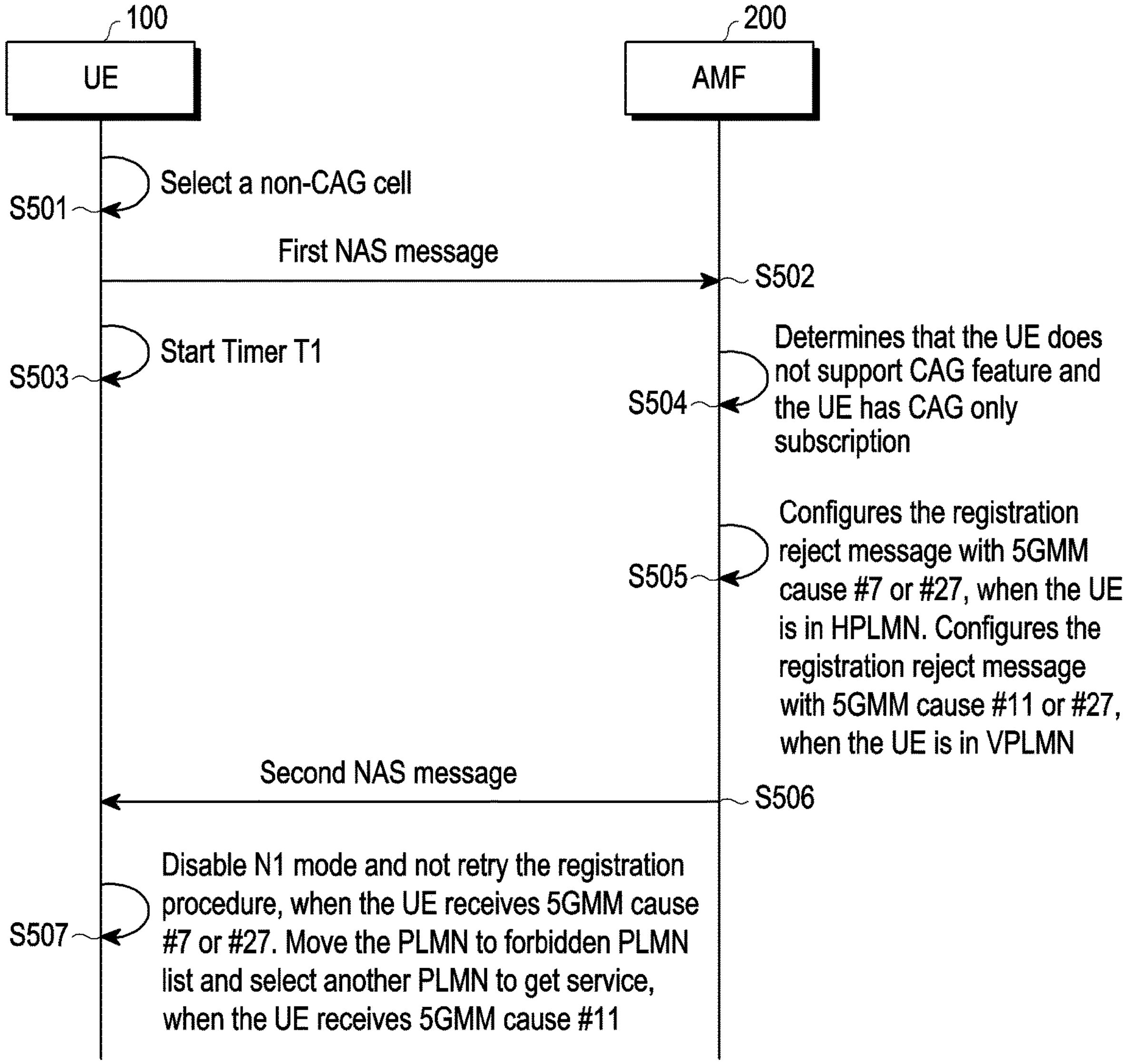
FIG. 5 illustrates a sequential diagram of signaling between the AMF and the UE for providing a 5GMM cause value other than 5GMM cause #76 to the UE, in response to rejecting a registering request message at the AMF, according to an embodiment as disclosed herein.

FIG. 5 illustrates a sequential diagram of signaling between the AMF (200) and the UE (100) for providing the 5GMM cause value other than the 5GMM cause #76 to the UE (100), in response to rejecting the registering request message at the AMF (200), according to an embodiment as disclosed herein. Consider, the UE (100) is not supporting the CAG feature and the UE (100) is coupled to the UICC (300) with the CAG subscription. At step S501, the UE (100) selects and camps on the non-CAG cell of the AMF (200), where the AMF (200) supports the CAG feature. At step S502, the UE (100) initiates the NAS procedure on the non-CAG cell to the AMF (200) and sends a first NAS message (i.e. registration request message) without the CAG support indicator to the AMF (200). At step S503, the UE (100) starts a timer T1 after sending the first NAS message.

At step S504, in response to receiving the first NAS message, the AMF (200) determines that the UE (100) does not support the CAG feature due to not finding a CAG support capability (i.e. CAG support indicator) from the first NAS message. Further, the AMF (200) determines that the UE (100) has the subscription to access 5GS via CAG cell only i.e. the UE (100) is allowed to camp only on the CAG cells according to the subscription. At step S504, when the UE (100) is in the HPLMN, then the AMF (200) configures a second NAS message (i.e. the registration reject message) with the 5GMM cause #7 or the 5GMM cause #27. When the UE (100) is in the VPLMN, then the AMF (200) configures the second NAS message (i.e. the registration reject message) with the 5GMM cause #11 or the 5GMM cause #27. At step S506, the AMF (200) sends the second NAS message to the UE (100) within an expiry of the timer T1. At step S507, the UE (100) disables the N1 mode and not retry the registration procedure, when the UE (100) detects the 5GMM cause #7 or the 5GMM cause #27 from the second NAS message. The UE (100) puts the PLMN to the forbidden PLMN list and select another PLMN to get the services, when the UE (100) detects the 5GMM cause #11 from the second NAS message.

Figure 6:
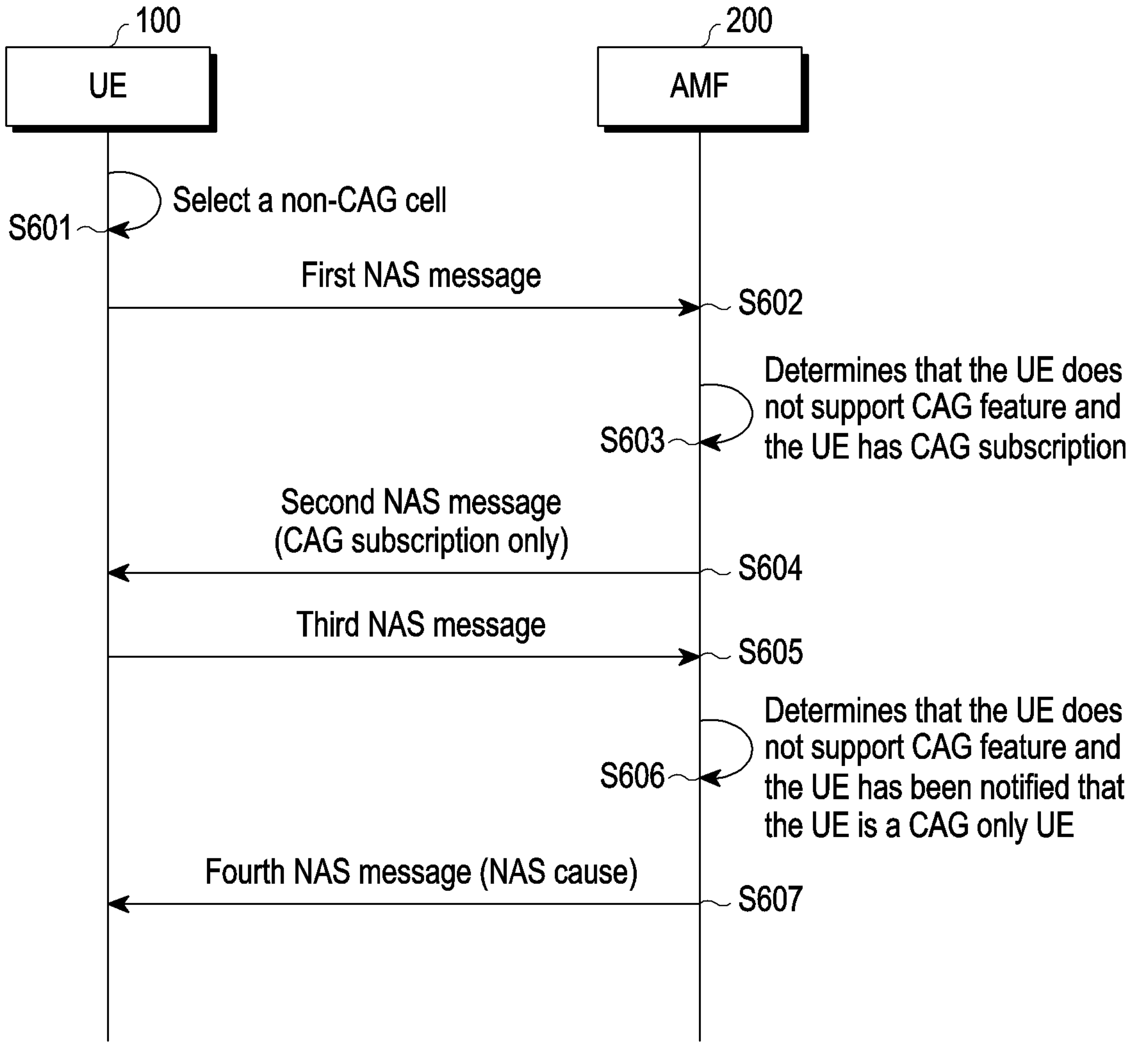
FIG. 6 illustrates a sequential diagram of signaling between the AMF and the UE for managing the registration request message from the UE, where the UE does not support the CAG feature, according to an embodiment as disclosed herein.

FIG. 6 illustrates a sequential diagram of signaling between the AMF (200) and the UE (100) for managing the registration request message from the UE (100), where the UE (100) does not support the CAG feature, according to an embodiment as disclosed herein. Consider, the UE (100) is not supporting the CAG feature and the UE (100) is coupled to the UICC (300) with the CAG subscription. At step S601, the UE (100) selects and camps on the non-CAG cell of the AMF (200), where the AMF (200) supports the CAG feature. At step S602, the UE (100) initiates the NAS procedure (i.e. initial registration procedure or periodic registration update procedure or registration update procedure or service request procedure or deregistration procedure) on the non-CAG cell to the AMF (200) and sends the first NAS message without the CAG support indicator to the AMF (200).

At step S603, in response to receiving the first NAS message, the AMF (200) determines that the UE (100) is subscribed to the CAG subscription i.e. the UE (100) is allowed to access the 5GS through the CAG cell only according to the subscription. Further, the AMF (200) determines that the UE (100) does not support the CAG feature, in response to not finding the CAG support indicator in the first NAS message. Further, the AMF (200) completes the NAS procedure. At step S604, the AMF (200) sends the second NAS message including an IE indicating that the UE (100) is allowed to access the 5GS via CAG cell only.

The UE (100) continues to camp on the non-CAG cell or select another the non-CAG cell to camp due to not supporting the CAG feature, in response to receiving the second NAS message. At step S605, the UE (100) initiates the NAS procedure (i.e. initial registration procedure or periodic registration update procedure or registration update procedure or service request procedure or deregistration procedure) on the non-CAG cell to the AMF (200) and sends a third NAS message without the CAG support indicator to the AMF (200). At step S606, in response to receiving the third NAS message, the AMF (200) determines that the UE (100) does not support the CAG feature and the UE (100) has been notified that the UE (100) is a CAG only UE (i.e. the UE is allowed to access the 5GS through the CAG cell).

At step S607, in response to receiving the third NAS message, the AMF (200) determines that the UE (100) does not support the CAG feature and the UE (100) has been notified that the UE (100) is a CAG only UE (i.e. the UE is allowed to access the 5GS through the CAG cell). At step S607, the AMF (200) rejects the NAS procedure and sends a fourth NAS message (e.g. a NAS message related to rejection of the registration procedure) including one of the NAS cause #3, the NAS cause #6, the NAS cause #7, the NAS cause #11, the NAS cause #12, the NAS cause #13, the NAS cause #15, the NAS cause #22, the NAS cause #27, and the NAS cause #31.

Figure 7:
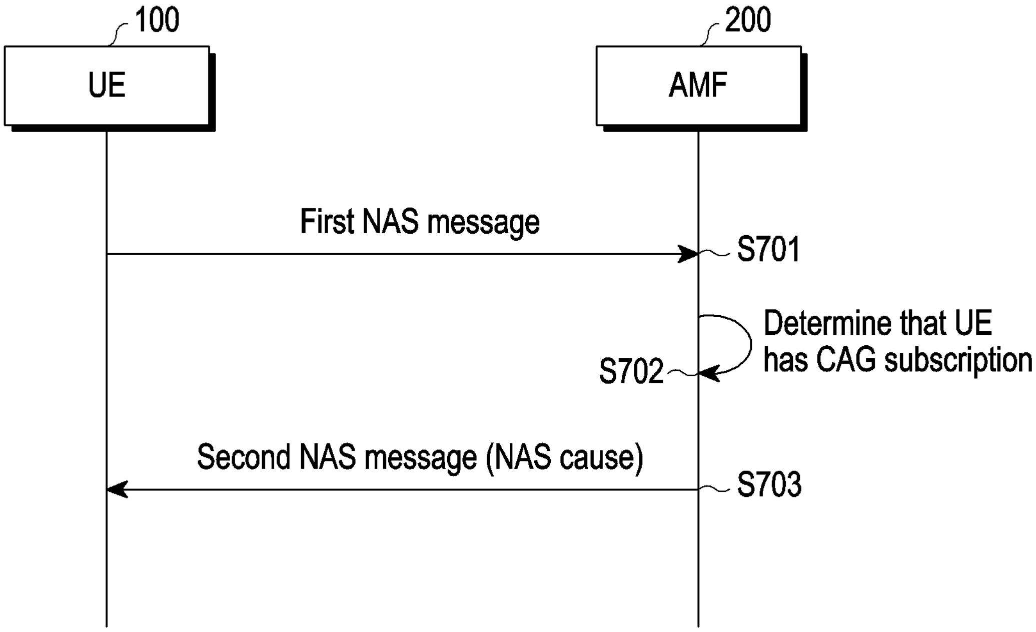
FIG. 7 illustrates a sequential diagram of signaling between the AMF and the UE for managing the registration request message from the UE, where the UE does not support the CAG feature, according to an embodiment as disclosed herein.

FIG. 7 illustrates a sequential diagram of signaling between the AMF (200) and the UE (100) for managing the registration request message from the UE (100), where the UE (100) does not support the CAG feature, according to an embodiment as disclosed herein. At step S701, the UE (100) initiates the NAS procedure (i.e. initial registration procedure or periodic registration update procedure or registration update procedure or service request procedure or deregistration procedure) on the non-CAG cell. In an embodiment, the first NAS message includes at least one of a Network Slice Selection Assistance Information (NSSAI) and a Data Network Name (DNN). In one example the UE (100) supports the CAG feature. In another example the UE (100) does not support the CAG feature. In one example the UE (100) has not received the CAG only indication from the AMF (200) indicating the UE (100) is allowed to access the 5GS only via the CAG cell or the UE (100) has not configured with an allowed CAG list. The allowed CAG list is a list of CAG IDs corresponds to the CAG cells allowed to the UE (100) to access. In one example, the AMF (200) does not support CAG feature.

At step S702, the AMF (200) determines that the UE (100) has the CAG subscription, when a Single NSSAI (S-NSSAI) in the NSSAI or the DNN is used for a public network integrated Non-Public Networks (NPN). When all the S-NSSAI in the NSSAI are only used to access the service for the public network integrated NPN, then the AMF (200) determines that the UE (100) is the CAG only UE. When the DNN indicates that the DNN is used only for the public network integrated NPNs, then the AMF (200) determines that the UE (100) has the CAG subscription. In one example the AMF (200) determines that the UE (100) has subscription for the CAG, when all the subscribed S-NSSAIs or the DNNs of the UE (100) are used for public network integrated NPNs. In an embodiment the NSSAI includes of only S-NSSAI. At step S703, in response to determining that the UE (100) is the CAG only UE, the AMF (200) sends the second NAS message (e.g. a NAS message related to rejection of the registration procedure) including one of the NAS cause #3, the NAS cause #6, the NAS cause #7, the NAS cause #11, the NAS cause #12, the NAS cause #13, the NAS cause #15, the NAS cause #22, the NAS cause #27, and the NAS cause #31.

The embodiments disclosed herein can be implemented using at least one software program running on at least one hardware device and performing network management functions to control the elements.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for managing a closed access group (CAG) feature by a user equipment (UE), the method comprising:

transmitting, to an access and mobility management function (AMF), a registration request message including first information indicating that the UE does not support the CAG feature, second information on network slice selection assistance information (NSSAI), and third information on a data network name (DNN); and receiving, from the AMF, a registration reject message including non-access-stratum (NAS) cause in response to the registration request message in case that the UE does not support the CAG feature and the UE is allowed to access a 5G system (5GS) via a CAG cell only, wherein the NAS cause is one of NAS cause #7, NAS cause #11, and NAS cause #27.

2. The method of claim 1, wherein the UE camps a non-CAG cell of a network which supports the CAG feature and the AMF supports the CAG feature.

3. The method of claim 1, wherein the NAS cause #7 indicates 5GS services are not allowed, wherein the NAS cause #11 indicates a public land mobile network (PLMN) is not allowed, and wherein the NAS cause #27 indicates an N1 mode is not allowed.

4. A method for managing a closed access group (CAG) feature by an access and mobility management function (AMF), the method comprising:

receiving, from a user equipment (UE), a registration request message including first information indicating that the UE does not support the CAG feature, second information on network slice selection assistance information (NSSAI), and third information on a data network name (DNN); and transmitting, to the UE, a registration reject message including non-access-stratum (NAS) cause in response to the registration request message, in case that the UE does not support the CAG feature and the UE is allowed to access a 5G system (5GS) a CAG cell only, wherein the NAS cause is one of NAS cause #7, NAS cause #11, and NAS cause #27.

5. The method of claim 4, wherein the AMF supports the CAG feature and the UE camps a non-CAG cell of a network which supports the CAG feature.

6. The method of claim 4, wherein the NAS cause #7 indicates 5GS services not allowed, wherein the NAS cause #11 indicates a public land mobile network (PLMN) not allowed, and wherein the NAS cause #27 indicates N1 mode not allowed.

7. A user equipment (UE) for managing a closed access group (CAG) feature, the UE comprising:

a transceiver; and a controller coupled with the transceiver and configured to control to:

transmit, to an access and mobility management function (AMF), a registration request message including first information indicating that the UE does not support the CAG feature, second information on network slice selection assistance information (NSSAI), and third information on a data network name (DNN), and receive, from the AMF, a registration reject message including non-access-stratum (NAS) cause in response to the registration request message in case that the UE does not support the CAG feature and the UE is allowed to access a 5G system (5GS) via a CAG cell only, wherein the NAS cause is one of NAS cause #7, NAS cause #11, and NAS cause #27.

8. The UE of claim 7, wherein the UE camps a non-CAG cell of a network which supports the CAG feature and the AMF supports the CAG feature.

9. The UE of claim 7, wherein the NAS cause #7 indicates 5GS services are not allowed, wherein the NAS cause #11 indicates a public land mobile network (PLMN) is not allowed, and wherein the NAS cause #27 indicates an N1 mode is not allowed.

10. An access and mobility management function (AMF) for managing a closed access group (CAG) feature, the AMF comprising:

a transceiver; and a controller coupled with the transceiver and configured to control to:

receive, from a user equipment (UE), a registration request message including first information indicating that the UE does not support the CAG feature, second information on network slice selection assistance information (NSSAI), and third information on a data network name (DNN), and transmit, to the UE, a registration reject including non-access-stratum (NAS) cause in response to the registration request message, in case that the UE does not support the CAG feature and the UE is allowed to access a 5G system (5GS) a CAG cell only, wherein the NAS cause is one of NAS cause #7, NAS cause #11, and NAS cause #27.

11. The AMF of claim 10, wherein the AMF supports the CAG feature and the UE camps a non-CAG cell of a network which supports the CAG feature.

12. The AMF of claim 10, wherein the NAS cause #7 indicates 5GS services not allowed, wherein the NAS cause #11 indicates a public land mobile network (PLMN) not allowed, and wherein the NAS cause #27 indicates N1 mode not allowed.

* * * * *